3,315,001
PRODUCTION OF ALKYL CHLORIDES
Elliott L. Weinberg, 8 Clovis Road,
East Brunswick, N.J. 08816
No Drawing. Filed Dec. 16, 1963, Ser. No. 330,606
4 Claims. (Cl. 260—652)

The present invention relates to a method of preparing alkyl chlorides.

The known methods for the preparation of alkyl chlorides use basically two different routes, both having certain inconveniences.

The conversion of an alcohol to be reacted with hydrochloric acid is usually assisted by the presence of zinc chloride or other dehydrating agents. When this process is used, one shortcoming consists in the fact that the step of recovering the zinc chloride requires high temperatures and undesirable unsaturated compounds result therefrom. Moreover, the process is not capable of yielding a useful output of a suitable product.

The use of thionyl chloride, which may also serve as chlorinating agent, is very expensive and does not lead to an economical process applicable for technical purposes. Both known processes do not furnish any valuable by-products.

It is, therefore, the object of the present invention to provide an economical method for the preparation of alkyl chlorides which overcomes the drawbacks of known processes and which not only provides excellent yields in the main product, but at the same time makes possible the recovery of useful by-products.

Other objects and advantages will become apparent from the following detailed description.

According to the invention the alcohol to be converted into the corresponding alkyl chloride is first reacted with phosphorus trichloride at low temperature whereby a monoalkoxy phosphorus dichloride is formed; in a second step, the dichloride is chlorinated at low temperature to form alkyl chloride and phosphorus oxychloride.

The equation for the indicated reactions are as follows:

(1) $\text{ROH} + \text{PCl}_3 \xrightarrow{\leq 10°\text{C}.} \text{ROPCl}_2 + \text{HCl}$ (2) $\text{ROPCl}_2 + \text{Cl}_2 \xrightarrow{\leq 10°\text{C}.} \text{RCl} + \text{POCl}_3$ The symbol $\leq$ stands for less than or equal to. With appropriate low temperature operation in both steps and fractionation, yields of about 90% for alkyl chloride and 90% phosphorus oxychloride are obtainable.

The invention will now be more fully described in a number of examples, but it should be understood that these are given by way of illustration and not of limitation and that many changes in the details can be made without departing from the spirit of the invention.

In the examples, percentages given are weight percent.

EXAMPLE 1

Preparation of n-octyl chloride

A two-liter 3-nech flask was equipped with a stirrer, a thermometer, a reflux condenser with a drying tube, and a dropping funnel. 687 grams phosphorus trichloride were introduced into the flask and cooled externally to about 10° C. 650 grams n-octyl alcohol, 98% $C_8$, were added dropwise to the agitated phosphorus trichloride. Anhydrous hydrogen chloride was vented through the reflux condenser from the start and venting was continued during the addition of the alcohol. When all the alcohol had been added, a gas inlet tube was put in place of the dropping funnel. Chlorine gas (355 gms.) was introduced as rapidly as possible while maintaining the temperature below 10° C. When the correct amount of $\text{Cl}_2$ had been added, a fractionating column was substituted for the reflux condenser, and the gas inlet tube was replaced by a stopper. The phosphorus oxychloride formed in the reaction was distilled at slightly reduced pressure with a head temperature of 85–95° C. (Atmospheric pressure would call for 107° C. head temperature.) A total of 690 grams of phosphorus oxychloride was recovered (90%). The residual n-octyl chloride was washed with water until neutral wash water was obtained. The washed n-octyl chloride was dehydrated in vacuo and vacuum distilled at 68–78° C. at 12–15 mm. The yield was 668 grams (90%).

EXAMPLE 2

The procedure described in Example 1 was followed, using n-dodecylalcohol (744 grams), phosphorus trichloride (552 grams) and chlorine (284 grams). All procedures were the same. The phosphorus oxychloride yield was 555 grams (90%). The n-dodecyl chloride distilled at 125–135° C. at 12–15 mm. The yield was 736 grams (90%).

EXAMPLE 3

The procedure described in Example 1 was followed using n-butyl alcohol (555 grams), phosphorus trichloride (1028 grams) and chlorine (532 grams). Because of the low boiling point of n-butyl chloride, it was distilled off at atmospheric pressure with a head temperature of 77–80° C. The yield was 625 grams. The residual phosphorus oxychloride was distilled at atmospheric pressure (105–109° C.) and a yield of 1035 grams was obtained.

While in the above examples the alcohols described as starting materials are all straight-chain alkyl alcohols, it should be understood that branched chain alcohols such as 2-ethyl hexanol, isopropanol, and aryl substituted primary alcohols, e.g. benzyl alcohol or phenyl ethanol, could likewise be reacted with phosphorus trichloride under conditions similar to those described in Examples 1–3, and the yields obtained in the respective chlorinated hydrocarbon compounds would be just as satisfatcory.

As will be apparent from the examples, the yields in the by-product phosphorus oxychloride are very high. Since the market price of phosphorus oxychloride is about the same as the one of phosphorus trichloride, the expenses in the process are dependent only on the alcohol and chlorine costs. This makes the process economically superior to the processes of the art because those have to carry the expenses of dehydrating agents in addition to the chlorinating costs.

Alkyl chlorides are very useful starting compounds in a large number of processes of organic synthesis.

What is claimed is:

1. Process for preparing alkyl chlorides which comprises subjecting a monoalkoxy phosphorus dichloride to chlorination with an equimolar amount of chlorine gas at temperatures between −10° and +10° C., thereby obtaining the desired alkyl chloride and, as a by-product, phosphorus oxychloride.

2. The process for preparing mono-octyl chloride which comprises subjecting mono-octyl oxy-phosphorus dichloride to chlorination with an equimolar amount of chlorine gas at temperatures between −10° and +10° C., distilling off the phosphorus oxychloride, and recovering the octylchloride from the residue.

3. The process for preparing mono-dodecyl chloride which comprises subjecting mono-dodecyl oxy-phosphorus dichloride to chlorination with an equimolar amount of chlorine gas at temperatures between −10° and +10° C., distilling off the phosphorus oxychloride and recovering the dodecyl chloride from the residue.

4. The process for preparing mono-n-butyl-chloride which comprises subjecting mono-n-butyl oxy-phosphorus dichloride to chlorination with an equimolar amount of chlorine gas at temperatures between −10° and +10° C., distilling off the phosphorus oxychloride, and recovering n-butyl-chloride from the residue.

References Cited by the Examiner

UNITED STATES PATENTS

| | | | |
|---|---|---|---|
| 2,078,421 | 4/1937 | Shuman | 260—986 X |
| 2,409,039 | 10/1946 | Hardy et al. | 260—986 |
| 2,426,691 | 9/1947 | Jenkins | 260—986 |
| 2,478,008 | 8/1949 | Plump | 260—652 X |
| 3,179,695 | 4/1965 | Weilmuenster et al. | 23—203 X |

OTHER REFERENCES

Van Wazer: Phosphorus and Its Compounds, vol. I (1958, pp. 817–818).

LEON ZITVER, *Primary Examiner.*

K. V. ROCKEY, N. J. KING, *Assistant Examiners.*